(12) United States Patent
Chew et al.

(10) Patent No.: US 7,313,795 B2
(45) Date of Patent: Dec. 25, 2007

(54) METHOD AND SYSTEM FOR MANAGING RESOURCE ALLOCATION IN NON-UNIFORM RESOURCE ACCESS COMPUTER SYSTEMS

(75) Inventors: Jonathan Chew, San Francisco, CA (US); Robert L. Berube, Brookline, NH (US); Kevin Clarke, Princeton, MA (US); Tim Marsland, Half Moon Bay, CA (US); Eric Saxe, Fremont, CA (US); Bart Smaalders, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 777 days.

(21) Appl. No.: 10/446,741

(22) Filed: May 27, 2003

(65) Prior Publication Data

US 2004/0243660 A1     Dec. 2, 2004

(51) Int. Cl.
*G06F 9/46*     (2006.01)
*G06F 15/16*    (2006.01)
*G06F 15/173*   (2006.01)

(52) U.S. Cl. .................. 718/104; 709/252; 709/226
(58) Field of Classification Search ................ 709/213
See application file for complete search history.

(56) References Cited

U.S. PATENT DOCUMENTS

2002/0087652 A1 *   7/2002   Davis et al. ................ 709/213

* cited by examiner

*Primary Examiner*—Meng-Al T. An
*Assistant Examiner*—Eric C Wai
(74) *Attorney, Agent, or Firm*—Martine Penilla & Gencarella, LLP

(57) ABSTRACT

A method and system of managing resource allocation in a non-uniform resource access computer system is disclosed. A method comprises determining access costs between resources in a computer system having non-uniform access costs between the resources. The method also includes constructing a hierarchical data structure comprising the access costs. The hierarchical data structure is traversed to manage a set of the resources.

24 Claims, 5 Drawing Sheets

METHOD AND SYSTEM FOR MANAGING RESOURCE ALLOCATION IN NON-UNIFORM RESOURCE ACCESS COMPUTER SYSTEMS

BACKGROUND OF THE INVENTION FIELD OF THE INVENTION

The present invention relates to the field of non-uniform resource access computer systems. Specifically, embodiments of the present invention relate to methods and systems providing a hierarchical data structure describing access costs to resources in order to facilitate managing the resources.

BACKGROUND ART

Uniform Memory Access (UMA) computer systems have the characteristic of a processor, for example, CPU (Central Processing Unit), having essentially the same access time to all memory resources. There may be multiple CPUs in such a system, each with the characteristic of little or no performance difference for one memory resource over another based on access cost. In such a system, there is little or no benefit in assigning memory resources to a given CPU based on expected access time. In contrast, for Non-Uniform Memory Access (NUMA) computer systems, the cost for a CPU to access memory can vary significantly for different memory resources. For example, some memory resources may be closer to a CPU and others farther away. Thus, there can be a benefit of assigning a CPU or memory resource to a process based on expected access cost.

One conventional technique of allocating CPU and memory resources based on access time is to discover details of the hardware configuration to determine which memory resources are near which CPUs. However, the hardware configuration information that is typically collected does not easily facilitate the allocation of resources. For example, the hardware configuration information may include details about CPUs, physical addresses, boards, etc. It is difficult to base a resource allocation decision based on such hardware configuration information. Further, while the hardware configuration information can be passed to an application program, the application program must understand how the operating system and hardware function in order to take advantage of the hardware configuration information. Moreover, modifying the application program to take advantage of the hardware configuration information makes the application program less portable.

To avoid the above complications, CPU and memory resources can be allocated without regard to access cost. While this technique is simple, it results in slower execution than would be possible with a more intelligent allocation of CPU and memory resources. While the above discusses problems with allocating CPU and memory resources, allocating resources other than CPU and memory resources also presents problems for conventional techniques.

Therefore, a problem with conventional methods of allocating resources in non-uniform resource access computer systems is the difficulty in basing a resource allocation decision on hardware configuration information. Another problem with conventional methods of allocating resources in non-uniform resource access computer systems is that application programs need to be modified to allow them to take advantage of hardware configuration information. Another problem is the inefficient allocation of resources when resources are allocated without regard to access costs.

SUMMARY OF THE INVENTION

The present invention provides methods and systems of facilitating resource management in a non-uniform resource access computer system. Embodiments of the present invention allow a resource allocator to easily decide between a resource with the lowest access cost, a next lowest access cost, etc. Embodiments of the present invention may be transparent to application programs, and hence do not require modification to the application programs. However, embodiments of the present invention may also provide access cost information to applications to allow observability and the opportunity to use the information to customize its resource allocation as it pleases. Embodiments of the present invention facilitate efficient allocation of resources in a non-uniform resource access computer system. The present invention provides these advantages and others not specifically mentioned above but described in the sections to follow.

Embodiments of the present invention provide an abstraction for the operating system and application programs to use for improving performance on NUMA machines. An access cost group is used to represent a group of resources that share a common access cost value. For example, an access cost group may contain a group of CPUs and a memory resource, wherein each of the CPUs has the same access cost value to the memory resource, or vice versa. An access cost function defines how the access cost value is calculated and may be defined by any suitable combination of parameters. Access cost groups are arranged in a hierarchical data structure such that children contain resources that are closer together than the resources contained in the child's parent(s). The hierarchical data structure makes it easy for the operating system and application programs to determine what resources are close to each other without knowing the details of the hardware. The hierarchical data structure makes it possible to determine not only the closest resource, but also the next closest resource and each successive closest resource.

Methods and systems of managing resource allocation in a non-uniform resource access computer system are disclosed. A method comprises determining access costs between resources in a computer system having non-uniform access costs between the resources. The method also includes constructing a hierarchical data structure comprising the access costs. The hierarchical data structure is traversed to manage a set of the resources.

DETAILED DESCRIPTION OF THE INVENTION

Figure 1A:
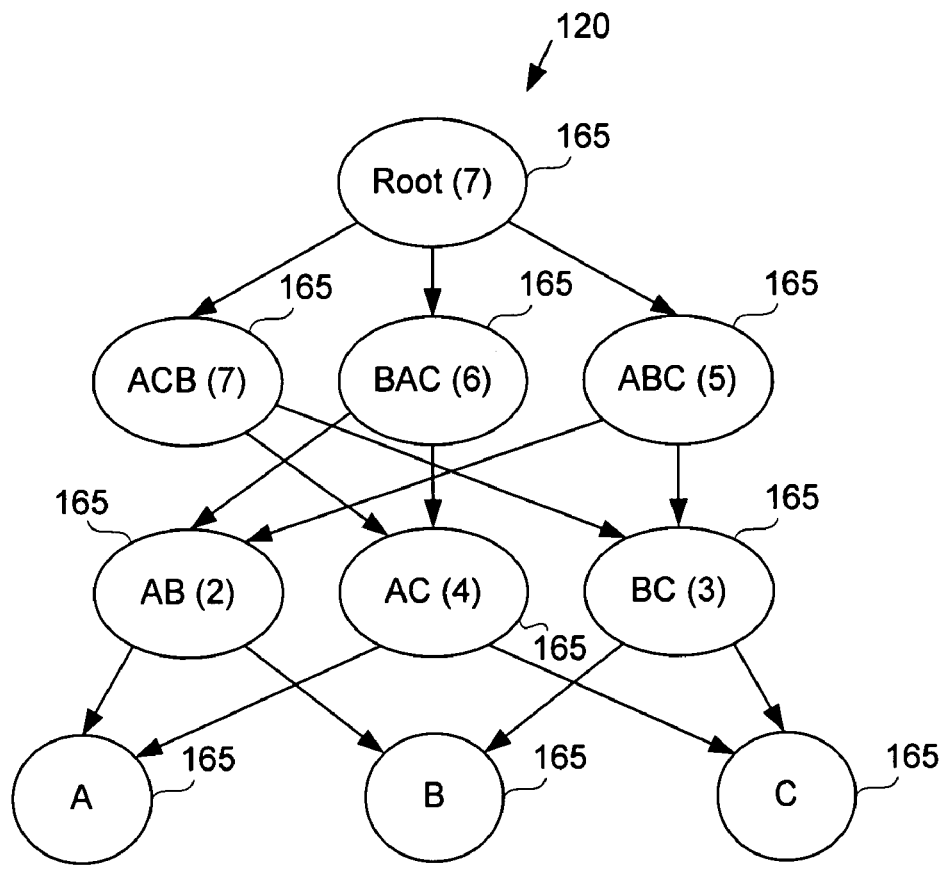
FIG. 1A illustrates a hierarchical data structure that facilitates managing resources a system having non-uniform access costs between resources, according to an embodiment of the present invention.

In the following detailed description of the present invention, methods and systems of facilitating resource management in a non-uniform resource access computer system, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory (e.g., processes 200 and 300). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "traversing" or "processing" or "computing" or "forming" or "calculating" or "determining" or "allocating" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Managing Resource Allocation

Embodiments of the present invention provide a method and system of managing resource allocation in a non-uniform resource access computer system. For example, embodiments facilitate allocating memory to a process running in a CPU in a Non-Uniform Memory Access (NUMA) system. However, the present invention is not limited to the resources being CPUs and memory resources. For example, the resources may be input/output devices. Embodiments of the present invention abstract away from hardware configuration information such that the resource allocator does not need to know the details of the hardware configuration.

FIG. 1A illustrates an exemplary hierarchical data structure 120 that facilitates managing resources in a computer system having non-uniform access between resources, according to an embodiment of the present invention. Typically, the hierarchical data structure 120 is constructed by an operating system, although this is not a requirement. The hierarchical data structure 120 is usually constructed when the computer system is booted. However, changes can be made to the hierarchical data structure 120 at any time, and it can be constructed at any time. The hierarchical data structure 120 can be used by an operating system, an application program, etc., to facilitate resource allocation. However, it is not required that an application program use or even be aware of the hierarchical data structure 120 when requesting resources. Therefore, no modifications have to be made to application programs to take advantage of the improved efficiency available through embodiments of the present invention.

The exemplary hierarchical data structure 120 of FIG. 1A contains access cost information such that resources can be conveniently allocated without the resource allocator or requester knowing anything more about the hardware configuration. The access cost is generally not an inherent cost of accessing the resource, but is instead the cost of accessing the resource from some point. For example, the access cost may be the cost for a CPU to access a memory resource. More generally, the access cost is the cost for resource A to access resource B. Thus, in the previous example, the term "resource" is applied to both the CPU and the memory. In some cases, the access cost from resource A to resource B is the same in each direction, and this may be reflected in the construction of the hierarchical data structure 120. In other cases, the access cost from resource A to resource B does not equal the access cost in the other direction, and this would be reflected in the construction of the hierarchical data structure 120. The access costs are ordered in the exemplary hierarchical data structure 120 such that the exemplary hierarchical data structure 120 can be traversed to determine resources having a series of alternative access costs ranging from a best alternative, to a next best alternative, etc.

Figure 1B:
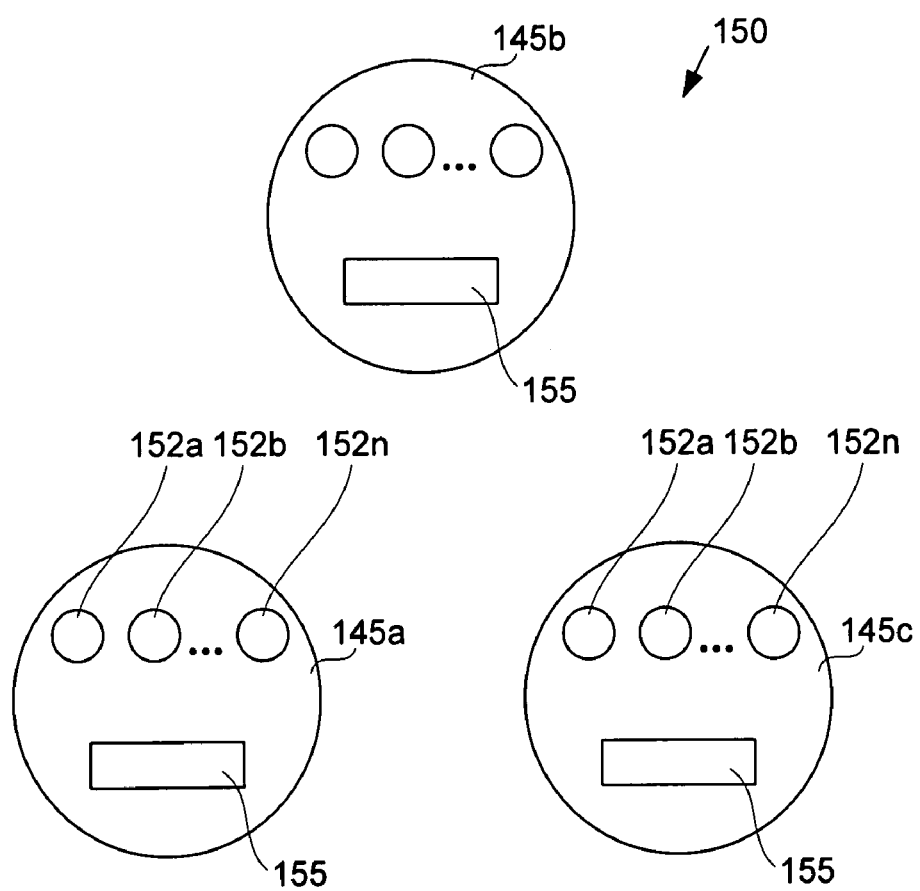
FIG. 1B illustrates an exemplary system having non-uniform access costs between resources for which embodiments of the present invention facilitate resource management.

FIG. 1B illustrates an exemplary non-uniform resource access computer system 150 having a ring topology, which will be used to explain principles of embodiments of the present invention. However, the present invention is not limited to ring topologies. The exemplary computer system 150 comprises CPUs 152 and memory resources 155. However, the present invention is applicable for resources other than CPUs 152 and memory resources 155. For example, the resources may be input/output devices. The exemplary computer system 150 comprises three local groups 145A-C, each of which is depicted with CPUs 152a-n and a single memory resource 155. A single memory resource 155 is shown to illustrate that, within a local group 145, the access cost between a CPU 152 and a memory resource 155 is essentially the same for any memory resource 155 within the local group 145. Local groups 145 are not a required element of the present invention.

Still referring to FIG. 1B, the access cost may be measured in terms of latency, although other measures may be used, alone or in combination. Typically, a CPU 152 will be allocated a memory resource 155 within its local group 145, as that has the lowest latency. However, it may become necessary, or at least desirable, for a CPU 152 to access a memory resource 155 outside of its local group 145. In this case, the latency will typically increase, and perhaps by a considerable amount. Moreover, the latency for a CPU 152 to access a memory resource 155 outside of its local group 145 is non-uniform. For example, the latency may be two units for a CPU 152 in group 145A to access a memory resource 155 in group 145, while the latency may be four units for a CPU 152 in group 145A to access a memory resource 155 in group 145C.

Referring now to both FIGS. 1A and 1B, the embodiment of FIG. 1A illustrates an exemplary hierarchical data structure 120 having four-levels. In this embodiment, the levels relate to how many hops there are between a CPU 152 and a memory resource 155. For example, the first level contains access costs for various cases in which a CPU 152 and a memory resource 155 are in the same local group 145. Note that there are many CPUs in a given local group 145. The nodes at the second level contain access costs for various cases in which there is a single hop in the ring topology between a CPU 152 and a memory resource 155. The nodes at the third level contain access costs for various cases in which there are two hops in the ring topology between a CPU 152 and a memory resource 155. However, the hierarchical data structure does not have to be organized in levels corresponding to hops in the ring topology. For example, the hierarchical data structure 120 may contain fewer levels as a simplification if less detail were sufficient or desired.

An access cost is indicated in parenthesis in each node of the exemplary hierarchical data structure 120 and, in general, access costs rise when proceeding from leaves to the root of the exemplary hierarchical data structure 120. Each node of the exemplary hierarchical data structure 120 corresponds to an access cost group. An access cost group defines the access cost between two or more resources in the exemplary system 150. For example, an access cost may define the latency for a CPU 152 to access a memory resource 155 or the minimum latency for CPUs 152a-n to access a memory resource 155.

The nodes at the lowest level of the exemplary hierarchical data structure 120 correspond to the local groups 145A-C in the exemplary system 150 and will be referred to as latency groups 165a-c. For example, latency group 165A in the exemplary hierarchical data structure 120 corresponds to local group 145A the exemplary system 150. There is not an access cost listed with this node because it is assumed that the local group will provide the lowest access cost, and thus the information is not needed for a resource allocation determination. However, there is no reason why an access cost cannot be listed in the nodes at the lowest level in the exemplary hierarchical data structure 120. Moreover, the lowest level in the hierarchical data structure 120 does not have to be a local group 145. As discussed earlier, the local group 145 is normally the best alternative in terms of access costs, but may not be available or desirable. As such, an alternative resource with a higher access cost may be allocated instead. Alternative resources are found by traversing upward in the exemplary hierarchical data structure 120. Furthermore, the hierarchical data structure may be organized such that the resource with the next best access cost can be found in the parent of the current latency group.

With the exception of the root node, each of the latency groups 165 has at least one parent node, which defines a latency group 165 with an alternative access cost that is typically a higher access cost than its child node. Referring to the exemplary hierarchical data structure 120, latency group 165A has two parent nodes—the latency groups 165A and 165AC. Latency group 165A reflects the cost for a CPU 152 in local group 145A to access a memory resource 155 in local group 145. The latency value in this case is two units. In one embodiment, the latency is defined by the lowest common latency experienced by any of the CPUs in local group 145A. However, the present invention is not limited to this measure. Due to the symmetry of the exemplary computer system 150, latency group 165B also has latency group 165AB as one of its parent nodes. Thus, latency group 165AB also reflects the latency for a CPU 152 in local group 145B to access a memory resource 155 in local group 145A.

Latency group 165AC reflects the cost for a CPU 152 in local group 145A to access a memory resource 155 in local group 145C. Latency group 165AC also reflects the cost for a CPU 152 in local group 145C to access a memory resource 155 in local group 145A. Thus, in this embodiment, the latency groups 165 at the second level of the exemplary hierarchical data structure 120 represents access costs for cases in which there is a single hop in the ring topology. However, it is not required that each level in the exemplary hierarchical data structure 120 corresponds to a certain number of hops. Finishing off the second level of the exemplary hierarchical data structure 120, latency group 165BC reflects the cost for a CPU 152 in local group 145B to access a memory resource 155 in local group 145C and also the cost for a CPU 152 in local group 145C to access a memory resource 155 in local group 145B.

In some cases, the memory resource 155 is reached after two hops in the ring topology. The latency groups (165ACB, 165BAC, 165ABC) at the third level of the exemplary hierarchical data structure 120 represent cases in which the resource is reached in two hops of the ring topology. For latency group 165ABC, the two hops are from local group 145A to local group 145B, and then to local group 145C. Latency group 165ABC has an access cost of five units, which is the sum of the access costs of the two hops. Group 165ABC can also represent the access cost of a memory resource 155 in local group 145A to a CPU 152 in local group 145C via local group 145B. Latency group 165ACB represents the case of two hops between local group 145A and local group 145B via local group 145C, and the reverse direction. Latency group 165BAC represents the case of two hops between local group 145B and local group 145C via local group 145A, and the reverse direction.

Figure 2:
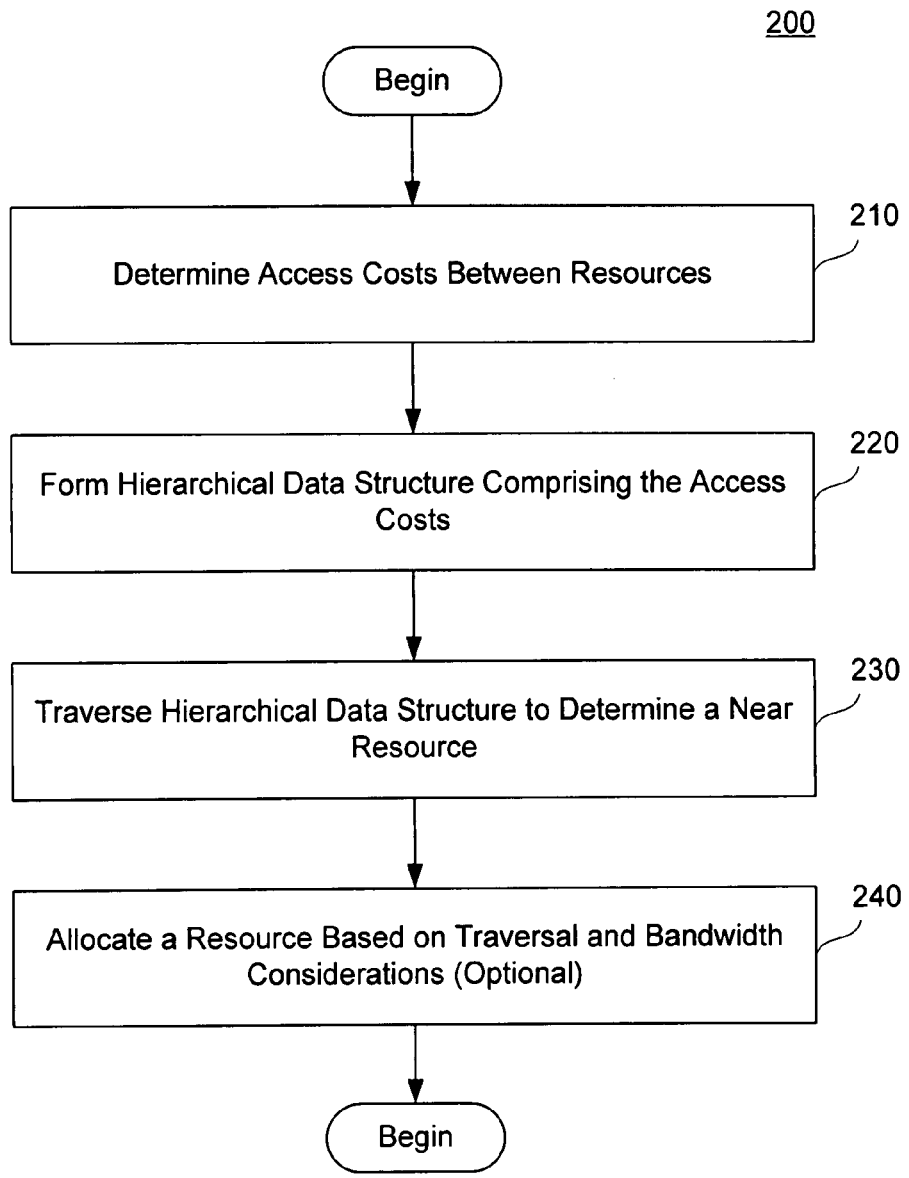
FIG. 2 is a flowchart illustrating steps of a process of facilitating resource management in a system having non-uniform access costs between resources, according to an embodiment of the present invention.

FIG. 2 illustrates a process 200 of facilitating resource allocation in a computer system having non-uniform access between the resources, according to an embodiment of the present invention. Steps of process 200 may be stored in a computer readable medium and executed in a general-purpose processor. In step 210, access costs are determined between resources in a computer system having non-uniform access costs between the resources. The manner of determining the access costs is not critical. In one embodiment, the access cost is measured in latency. Access cost may be defined by a function that comprises multiple parameters. The determination of access cost may involve determining latencies via a number of alternative paths between the resources. For example, in FIG. 1A, resources in local group 145C may be accessed directly from local group 145A or via a path through local group 145B. Step 210 may comprise forming access cost groups that comprise groups of resources that share a common access cost. In one embodiment, step 210 comprises forming access cost groups that define an access cost between pairs of resources. For example, a given CPU and memory resource may form one pair. There may be many such pairs in a single access cost group.

In step 220, a hierarchical data structure is formed comprising the access costs. The hierarchical structure is constructed to facilitate finding a resource near a selected resource, in terms of access cost. In one embodiment, a hierarchical data structure similar to the one illustrated in FIG. 1A is constructed. However, the present invention is not so limited. For example, the exemplary hierarchical data structure of FIG. 1A comprises a number of latency groups 165, such as latency group 165A, which defines an access cost of two units between resources in local groups 145A and 145B. In one embodiment, step 220 comprises ordering the access groups into levels and forming the hierarchical data structure according to the levels.

In step 230, the hierarchical data structure is traversed to determine a resource near a selected resource, in terms of the access costs. The near resource is not necessarily the nearest resource in terms of access costs.

In optional step 240, a resource is allocated based on bandwidth considerations. For example, the access cost may be specified as a latency under conditions with no other traffic. An operating system may select a resource other than the one with the lowest access cost in order to spread traffic on the various datapaths.

Figure 3:
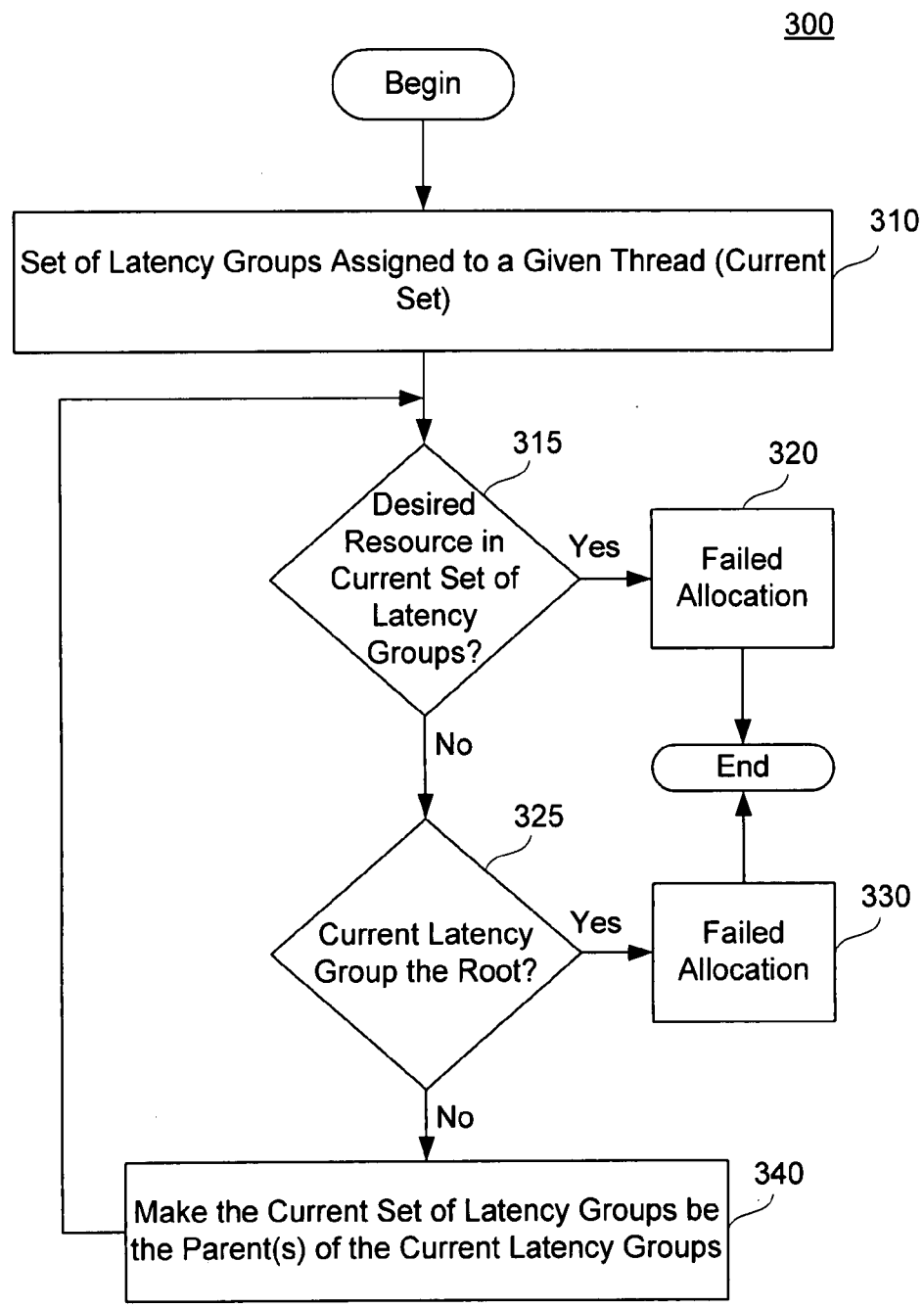
FIG. 3 is a flowchart illustrating steps of a process of traversing a hierarchical structure to allocate resources, according to an embodiment of the present invention.

FIG. 3 illustrates a process 300 of traversing a hierarchical data structure to allocate resources, according to an embodiment of the present invention. Steps of process 300 may be stored in a computer readable medium and executed in a general-purpose processor. Process 300 of FIG. 3 will be discussed in conjunction with FIGS. 1A and 1B. For the purposes of explanation, process 300 will be described in connection with an exemplary resource allocation in which an operating system is allocating resources for a thread that has been assigned to local group 145A in FIG. 1B. For example, the operating system may be allocating a memory resource given the CPU in which the thread is running. Alternatively, the operating system may be allocating a CPU based on a memory resource already assigned to the thread. The resource being allocated may be an input/output device instead of a CPU or memory. In step 310, a set of latency groups are assigned to a given thread. This set will be referred to as the current set of latency groups.

In step 315, the operating system attempts to allocate a resource from the current set of latency groups. For example, the lowest access cost is a resource within local group 145A and is represented by latency group 165A in the exemplary hierarchical data structure 120. If, in step 315, the operating system determines that it is appropriate to assign a resource from latency group 165A to the thread, it makes the allocation in step 320. The process 300 then ends. However, the allocation at this level may be unsuccessful. For example, a resource may not be available in the latency group 165A or the operating system may decide against the allocation for other considerations such as spreading out resource allocation. If step 315 was an unsuccessful allocation, then process 300 continues at step 325.

Step 325 is a check to see if the current latency group only contain the root node. If so, the process 300 goes to step 330 as the resource allocation has failed. The process 300 then ends. If the current latency group is not the root node, then the process 300 continues at step 340.

In step 340 of FIG. 3, the parent(s) of the current set of latency groups are made the new current set of latency groups. The process 300 then returns to step 315. For example, the operating system attempts to allocate resources at the parent(s) of the current node (e.g., FIG. 1A, 165A). Traversing up the exemplary hierarchical data structure 120 or FIG. 1A, the next best alternatives are represented in the second level the exemplary hierarchical data structure 120 by latency group 165AB, which has a latency of two units, and latency group 165AC, which has a latency of four units.

The operating system may choose to allocate a resource in the parent with the lowest access cost. However, a resource from the parent with the higher access may be allocated, if desired. If a suitable resource is found in the current set of latency groups, then the resource is allocated in step 320. Otherwise, the process returns to step 340 with one of the parent latency groups becoming the current ones. For example, the current latency groups are now 165AB and 165AC whose parents are latency groups 165ACB, 165BAC, and 165ABC, which have latencies of seven, six, and five units, respectively. Again, the operating system may allocate the lower access cost group; however, that is not required. The process 300 may repeat steps 315-340 until a suitable resource has been found or the process 300 exits with a failed allocation in step 330. By traversing the exemplary hierarchical data structure 120, the operating system learns the nearest resource, next nearest resources, etc.

The operating system may decide to allocate other than the nearest resource in terms of access cost. In one embodiment, the application of the hierarchical data structure is to balance the load across the local groups. For example, the operating system assigns each thread to a latency group and keeps track of how many threads are assigned to each latency group to balance the load across them. Furthermore, the operating system may optimize the bandwidth for a thread by assigning it to a non-leaf latency group such that its resources come from a wider range of local groups. For example, a thread assigned to the root latency group will spread it resources across the entire machine. In another example, a thread assigned to the latency group 165AB of FIG. 1A will spread its resources across local groups 145A and 145B of FIG. 1B.

In one embodiment of the present invention, the operating system or an application program uses the hierarchical data structure 120 to monitor resource allocation. For example, the hierarchical data structure 120 is traversed to determine what the various access costs are for the set of resources that have been allocated.

Figure 4:
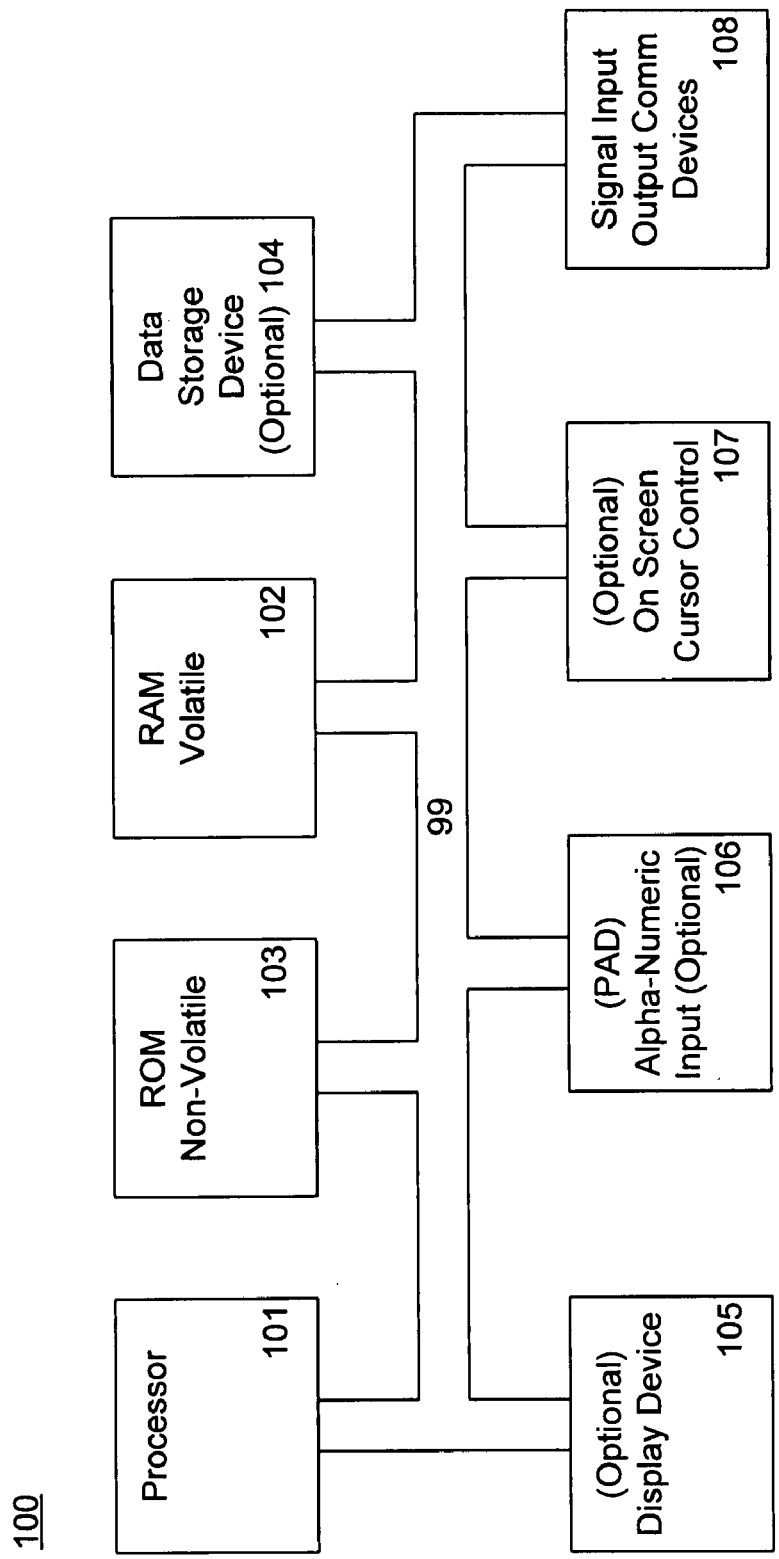
FIG. 4 is a computer system that may serve as a platform for embodiments of the present invention.

FIG. 4 illustrates circuitry of computer system 100, which may form a platform for embodiments of the present invention. For example, processes 200 and 300 of FIGS. 2 and 3, respectively, may be executed within computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 4, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. Signal input/output communication devices 108 coupled to bus 99 provides communication with external devices. The preferred embodiment of the present invention a method and system of facilitating resource allocation in a computer system, is thus described. While the present invention has been described in particular embodiments, it should be appreciated that the present invention should not be construed as limited by such embodiments, but rather construed according to the below claims.

What is claimed is:

1. A computer implemented method of managing resource allocation in a computer system having a plurality of resources coupled together through one or more paths, the plurality of resources including a first resource and a second resource, the computer implemented method comprising:
   a) determining access costs of accessing the first resource from the second resource wherein each of the access costs represents cost of access of the first resource from the second resource through each of the paths therebetween and access costs of the second resource from the first resource are different from the access costs of the first resource from the second resource;
   b) forming a hierarchical data structure comprising said access costs between each resource in the plurality of resources, the hierarchical data structure includes the paths connecting each of the resources, each of the paths having a number to represent an access cost, the hierarchical data structure is formed by nodes including access cost groups, the access cost groups having an access cost between pairs of the plurality of resources; and
   c) traversing said hierarchical data structure to determine a path between the first resource and the second resource, the path having a least access cost and available to enable access to the second resource from the first resource.

2. The method of claim 1, wherein said b) comprises constructing said hierarchical structure to facilitate finding near resources of said resources to a selected resource of said resources in terms of said access costs.

3. The method of claim 1, wherein: said a) comprises determining said access costs between at least two of said resources via a plurality of paths; and said b) comprises forming said hierarchical data structure comprising multiple nodes defining said access costs via said plurality of paths.

4. The method of claim 1, wherein said c) comprises traversing said hierarchical structure to determine a resource of said resources near a selected resource of said resources in terms of said access costs.

5. The method of claim 4, further comprising: d) allocating a resource based on said traversal in said c) and bandwidth considerations.

6. The method of claim 1, wherein said a) comprises determining access cost between pairs of said resources.

7. The method of claim 1, wherein the traversing further comprising allocating the second resource having the least access cost.

8. The method of claim 1, wherein the determining includes monitoring the plurality of resources for availability.

9. A computer readable medium having stored therein instructions for implementing a computer implemented method of managing resource allocation in a computer system having a plurality of resources coupled together through one or more paths, the plurality of resources including a first resource and a second resource, said computer implemented method comprising:
   a) forming a plurality of access cost groups each defining a path between the first resource and the second resource, each of the plurality of access cost groups further defines an access cost between the first resource and the second resource wherein access costs of the second resource from the first resource are different from the access costs of the first resource from the second resource;
   b) forming a hierarchical data structure having nodes comprising said access cost groups, the access cost group having an access cost between pairs of the plurality of resources, the hierarchical data structure includes the paths connecting each of the plurality of access cost groups, each of the paths having a number to represent an access cost; and
   c) traversing said hierarchical data structure to determine a path between the first resource and the second resource, the path having a least access cost and available to enable, access to the second resource from the first resource.

10. The computer readable medium of claim 9, wherein said b) of method further comprises linking a child node in said hierarchical data structure to at least one parent node in said hierarchical data structure, wherein said parent node comprises an access cost that is a next best alternative to an access cost of said child node.

11. The computer readable medium of claim 9, wherein said access costs are based on latency between pairs of said resources.

12. The computer readable medium of claim 9, wherein said c) of said method comprises traversing said hierarchical structure to determine a resource of said resources near a selected resource of said resources in terms of said access costs.

13. The computer readable medium of claim 9, wherein said c) of said method comprises traversing said hierarchical structure and factoring in bandwidth to determine a near resource of said resources to a selected resource of said resources in terms of said access costs.

14. The computer readable medium of claim 9, wherein: said a) of said method comprises forming said access cost groups for at least two of said resources for a plurality of paths between said at least two resources; and said b) of said method comprises forming said hierarchical data structure having nodes comprising said access cost groups formed based on said plurality of paths.

15. The computer readable medium of claim 9, wherein the traversing further comprising allocating the second resource having the least access cost.

16. The computer readable medium of claim 9, wherein the forming includes monitoring the plurality of resources for availability.

17. A computer system comprising:
   a plurality of resources having non-uniform access costs therebetween wherein the plurality of resources including a first resource and a second resource coupled together through one or more paths;
   a processor; and
   a computer readable medium having stored therein instructions that when executed on said processor implement a method of allocating said resources, said method comprising:
   a) determining access costs of accessing the first resource from the second resource wherein each of the access costs represents cost of access of the first resource from the second resource through each of the paths therebetween and access costs of the second resource from the first resource are different from the access costs of the first resource from the second resource between pairs of said resources;

b) forming a hierarchical data structure that is formed by nodes including access cost groups, the access cost groups having an access cost between pairs of the plurality of resources, wherein the nodes with higher access costs are placed higher in hierarchy of said data structure; and c) traversing said hierarchical data structure to determine a path between the first resource and the second resource, the path having a least access cost and available to enable access to the second resource from the first resource.

18. The computer system of claim 17, wherein said b) of said method further comprises ordering said nodes into levels and forming said hierarchical data structure according to said levels.

19. The computer system of claim 18, wherein said levels are based on hops taken between said pairs of said resources.

20. The computer system of claim 17, wherein child nodes in said hierarchical data structure have at least one parent node in said hierarchical data structure that defines a next best alternative access cost to access cost of the child node.

21. The computer system of claim 17, wherein said access costs are based on latency between said pairs of said resources.

22. The computer system of claim 17, wherein said method further comprises: c) traversing said hierarchical structure to determine a resource of said resources near a selected resource of said resources in terms of said access costs.

23. The computer system of claim 17, wherein said a) of said method further comprises determining latencies between processors and memory resources.

24. The computer system of claim 23, wherein said a) of said method further comprises determining latencies via a plurality of paths between said processors and said memory resources.

* * * * *